United States Patent

Freda et al.

Patent Number: 5,965,187
Date of Patent: Oct. 12, 1999

[54] METHOD OF PREPARING A MEAT PRODUCT HAVING DENATURED PROTEIN SURFACE

[75] Inventors: Joseph A. Freda, Barrington; Dennis Olson, Elgin; Joseph M. Freda, Wilmette, all of Ill.

[73] Assignee: C & F Packing Company, Inc., Elk Grove Village, Ill.

[21] Appl. No.: 09/056,214

[22] Filed: Apr. 7, 1998

[51] Int. Cl.$^6$ .................................... A23L 1/317
[52] U.S. Cl. ................... 426/513; 426/518; 426/641; 426/644; 426/645; 426/646; 426/647
[58] Field of Search .................... 426/641, 644, 426/645, 646, 647, 513, 518, 657

[56] References Cited

U.S. PATENT DOCUMENTS

| | | | |
|---|---|---|---|
| 4,156,027 | 5/1979 | Deppner, Jr. ........................ | 426/272 |
| 4,262,027 | 4/1981 | Tonner et al. ....................... | 426/325 |
| 4,378,379 | 3/1983 | Liesaus ................................ | 426/272 |
| 4,800,094 | 1/1989 | Freda et al. ......................... | 426/513 |
| 4,937,089 | 6/1990 | Ikoma et al. ........................ | 426/574 |
| 5,116,633 | 5/1992 | Small .................................... | 426/641 |
| 5,167,977 | 12/1992 | Gamay ............................ | 426/646 X |
| 5,221,554 | 6/1993 | Gamay ................................ | 426/646 |
| 5,405,632 | 4/1995 | Mahboob ............................ | 426/243 |
| 5,409,730 | 4/1995 | Fischer et al. ...................... | 426/646 |
| 5,482,730 | 1/1996 | Duve .................................... | 426/646 |
| 5,486,374 | 1/1996 | Fischer et al. ...................... | 426/574 |
| 5,543,164 | 8/1996 | Krochta et al. ..................... | 426/302 |
| 5,552,173 | 9/1996 | Singh et al. ......................... | 426/417 |
| 5,580,597 | 12/1996 | Kramer et al. ..................... | 426/412 |
| 5,650,187 | 7/1997 | Franklin et al. .................... | 426/417 |

Primary Examiner—Milton Cano
Attorney, Agent, or Firm—Niro, Scavone, Haller & Niro

[57] ABSTRACT

An uncooked meat portion that has shape-retaining and non-agglomeration properties is formed by subjecting the meat product to a process that causes controlled migration of soluble protein to the surface of nugget portions for positive internal binding characteristics, and subsequently heating the portions to a sufficient level to denature the surface proteins thereby encapsulating each portion in a thin-layer that will not stick to other encapsulated portions and that will enable each uncooked portion to retain it shape during handling.

15 Claims, 1 Drawing Sheet

METHOD OF PREPARING A MEAT PRODUCT HAVING DENATURED PROTEIN SURFACE

BACKGROUND OF THE INVENTION

Small-sized, individually quick frozen meat product portions are used in restaurants and prepared food service businesses for such applications as toppings for pizza or as ingredients for calzones and meat pies. Meat product portions for use in these applications are typically provided in the form of either raw meat portions or pre-cooked portions.

Precooked products having an irregular appearance, such as those described in U.S. Pat. No. 4,800,094, have the advantage of being capable of careful portion control and reduced likelihood of contamination. Those precooked products attempt to simulate the taste, appearance and overall effect that raw, uncooked product portions would have.

Raw or uncooked portions usually exhibit superior flavor and texture when cooked. They hold juices better and they hold moisture after freezing, thawing and cooking better than pre-cooked, frozen portions do. They arc generally more effective compared to pre-cooked portions. As noted above, pre-cooked portions, on the other hand, provide superior handling, portion control, low-waste, high yield and low shrinkage characteristics. Unlike raw portions, pre-cooked portions can be supplied in individual frozen pieces that are immediately separable for handling because they hold their shape and do not stick to each other. In contrast, raw meat product portions tend to agglomerate and generally cannot be formed into or handled as separate portions until after thawing. Raw meat product also produces waste, as loose, sticky particles adhere to tools and work surfaces. Pre-cooked meat portions provide the benefit of being able to easily and quickly handle and measure predetermined quantities for assembling food products, whether in frozen or thawed state, without the associated waste or need to thaw that raw meat involves. Pre-cooked meat portions are also less susceptible to cross-contamination than raw meat products by various microorganisms during meal preparation.

It is an object of the present invention to provide a meat product and method of preparing the same that combine the benefits of both uncooked and pre-cooked meat products, while avoiding the respective shortcomings of each. It is a further object to provide a product and associated method that provide a good balance of flavor, texture and cost-effectiveness typically associated with raw meats. It is still a further object to provide a product and associated method that permits optimum handling and portion control, low waste production, high yield and low shrinkage typically associated with pre-cooked meats.

SUMMARY OF THE INVENTION

It is desirable to provide a method of preparing meat products that combines the aforementioned benefits of both uncooked and pre-cooked meat products, while avoiding the respective shortcomings of each. The present invention provides a product and process of preparation for meat product portions or nuggets that exhibit the balanced properties of both uncooked and pre-cooked meat products. Such benefits are achieved by subjecting the meat product to a process that causes controlled migration of soluble protein to the surface of nugget portions for positive internal binding characteristics, and subsequently heating the portions to a sufficient level and in a controlled fashion to denature the surface proteins thereby encapsulating each portion in a thin-layer that will not stick to other encapsulated portions.

Grinding or mixing cold meat products will break down meat proteins into a sticky binder. The protein binder then causes the meat particles to agglomerate. The process described in the disclosed embodiment includes the step of physically working or mixing the meat product in a controlled temperature range for a predetermined time in order to effect protein break down and resultant binding capacity. The application of heat to a preferred temperature depending on specific meats will cause denaturing of meat protein. The meat product is then formed into desired individual pieces and heat treated in a controlled manner to denature and set the surface protein into an encapsulating, non-sticky layer. The heating conditions are desirably controlled in a precise fashion to avoid denaturing of internal particles resulting in loss of binding capacity.

DETAILED DESCRIPTION OF THE PREFERRED EMBODIMENT

Figure 1:
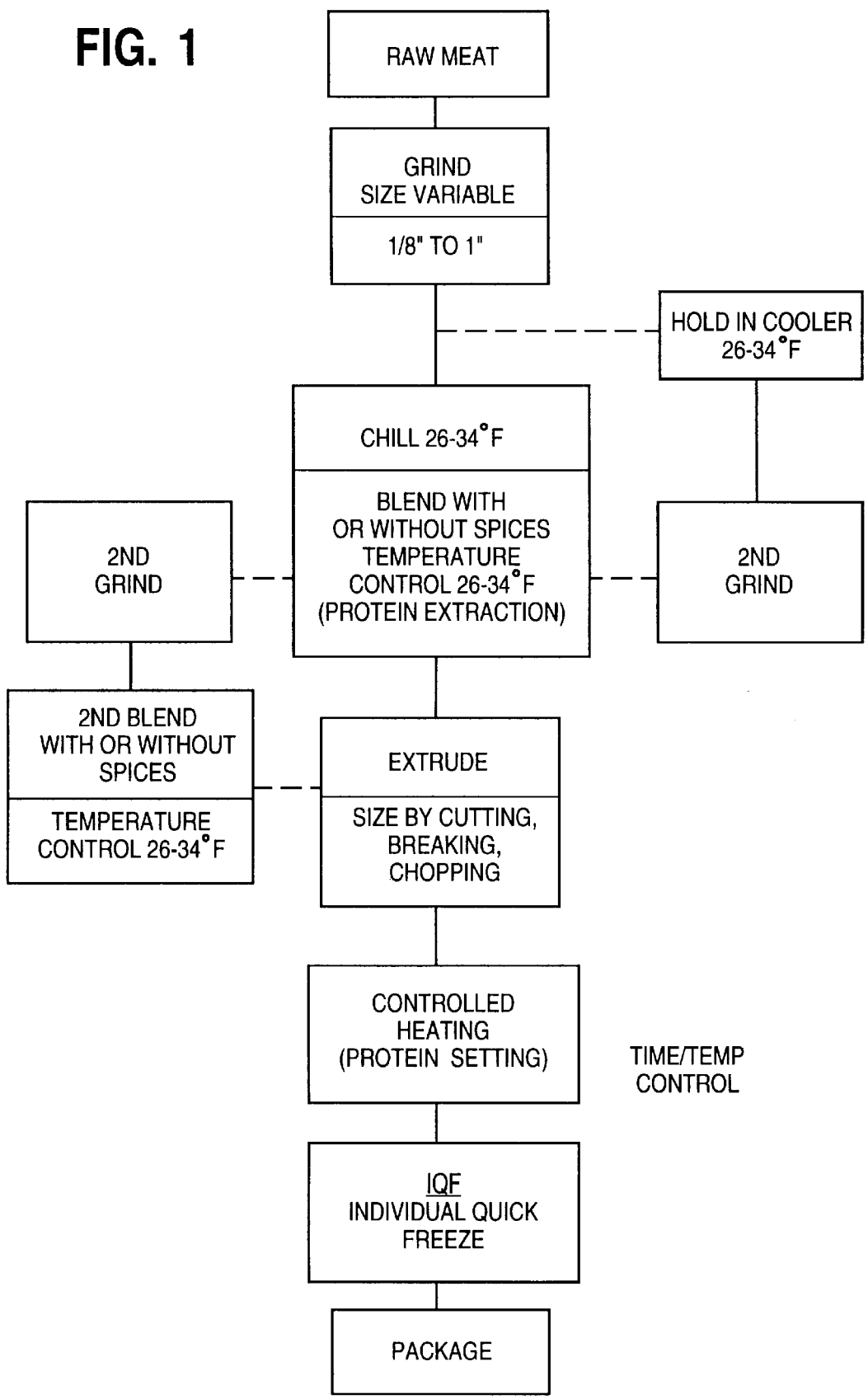
FIG. 1 is a flow diagram of the preferred embodiment of the present invention process.

A new process and end product are achieved through controlled blending or mixing at cool temperatures to break down or extract protein, and then through controlled heating to denature and stabilize the outer surface protein. The specific time and temperature range will vary with the desired texture, size and shape of the final meat product or nuggets desired and the type of meat used.

The starting point of the described process is to select the type of raw meat to be used. The selection of the meat type, such as beef, pork or poultry, as well as the cut, portion and desired end product characteristics will normally determine the specific parameter ranges of the process. The described process will work with various meats such as lamb, veal, and wild game, as well as with beef, pork or poultry.

An example of a sausage product can begin with cuts of pork.

Referring to the flow chart in FIG. 1 and the test data in the table shown below in Table 1, a procedure for making the product portions through controlled heating is herein described. For the present example pork is ground using conventional meat grinding equipment fitted with a grind plate having a hole size ranging from ⅛ inch to 1 inch diameter. The selection of the specific diameter is non-critical to the described process, and is merely a matter of preference.

Grinding reduces the size of the meat product. Generally, the more fine the ground meat product becomes, the more protein is extracted. More course grinds have less protein being extracted and generally have an improved overall texture.

A second grind is optimal and is used when the end-user desires a softer product that is easier to bite.

After grinding, the ground meat is preferably chilled to a temperature in the range of 26–34 degrees Fahrenheit. While the step of chilling the ground meat is not required to break down the meat protein, it enhances the protein breakdown and binding effected by mixing, and it preserves the color and fresh appearance of the meat. The specific temperature range may vary somewhat depending upon such factors as the type, grind size and desired portion size of the meat, and should be empirically selected according to the binding characteristics exhibited by the broken down protein. Chilling can be effected by blending the ground meat with carbon dioxide, ice or some other inert liquified gas, like nitrogen, or by other conventional means, to maintain the temperature within the specified range. The ground meat may be stored by conventional means or the meat may be subjected to immediate blending or mixing as indicated above. Optionally, the meat may be blended with spices, which in most applications is preferred.

By chilling the meat blend to temperatures below 26 degrees Fahrenheit, it can become too stiff and difficult to work. It is possible, of course, to go to temperatures as low as 18 degrees Fahrenheit, but that is not desired because of the stiffness and unworkability that results. At the other end of the preferred range, temperatures above 34 degrees Fahrenheit make the ground meat too soft; color can also change and workability also becomes more difficult because of softness.

Subsequent to chilling and blending, the meat is maintained at the cool temperature range and is subjected to extrusion. Extrusion is achieved using conventional equipment and methods, such as disclosed in U.S. Pat. No. 4,800,094. As the meat product is extruded, it is cut, broken or chopped into desired lengths resulting in individual portions.

Division of the chilled meat mass need not take place by extrusion, however, so long as the resultant product portions are divided properly. For example, division can be caused by dicing, by chopping, by cutting, by use of a rotating drum with shaped cookie-cutter-like cut-outs that roll over the blended portions or even by forming a product loaf and then chopping or cutting it with rotating knives.

The extrusion disclosed in the preferred embodiment can be done by forcing the chilled product mass through a plate having a plurality of spaced openings or orifices and then by cutting the portions as they exit from the opposite end of the plate.

Typically, preferred sizes can occur in the range between 120 pieces per pound and 5 pieces per pound. Size is among the factors in determining specific time and temperature ranges for heat treating to set surface protein. The raw meat portions have a random and irregular shape, but can be made more regular and less random if desired.

After individual product portions are formed, the meat product is subject to controlled heating to stabilize or set the surface layer protein. The product portions are thus quickly sealed on the outside, but not cooked internally. By creating a sealed exterior, the individual pieces become more easy to handle and distribute on a pizza or the like.

The meat product portions are preferably heated in hot water or hot oil, or by hot air or flame. It is also preferred that the temperature of heating be maintained within a range of about 100 degrees Fahrenheit to 140 degrees Fahrenheit for a time period ranging from 2 minutes to 9 minutes. As shown below in Table 1, when the temperature is too low, denaturing of the surface protein does not occur within a practical amount of time, if at all.

TABLE 1

| Temperature (degrees Fahrenheit) | Time (minutes:seconds) | Result |
| --- | --- | --- |
| 90 | — | surface protein does not set |
| 100 | 9:00 | surface protein sets |
| 110 | 5:00 | surface protein sets |
| 120 | 2:45 | surface protein sets |
| 130 | 2:30 | surface protein sets |

TABLE 1-continued

| Temperature (degrees Fahrenheit) | Time (minutes:seconds) | Result |
| --- | --- | --- |
| 140 | 2:15 | surface protein sets |
| 150 | 2:00 | surface protein sets |
| 160 | 1:45 | surface protein sets |
| 170 | 1:30 | surface protein sets |
| 180 | 0.30 | surface protein sets |
| 190 | 0:20 | surface protein sets |
| 200 | 0:10 | surface protein sets |
| 210 | 0:10 | surface protein sets |
| 220 | 0:05 | surface protein sets |
| 230 | 0:03 | surface protein sets |

While higher temperatures can be employed, more precision is required to quickly remove the meat product from the heat source to prevent cooking. The preferred temperature and time ranges are selected so that the surface layer of protein denatures and sets within 2 to 9 minutes without causing the inside of the nugget portion to cook. The ranges may vary somewhat with the type, grind and size of the meat portions. As shown in Table 1 above, test samples were subjected to various temperatures ranging from 90 degrees Fahrenheit to 230 degrees Fahrenheit, and held for periods ranging from 2 to 9 minutes. It is generally understood that most meat proteins will not denature at temperatures below 100 degrees Fahrenheit. Thus, maintaining the internal nugget temperature at a sufficiently low temperature will maintain the binding properties of the meat product.

After the portions are heated to set the surface protein layer, they are subjected to individual quick freezing by conventional means at a preferred temperature of minus 25 degrees Fahrenheit. Following quick freezing, the portions may be packaged in a conventional manner. Upon thawing, the uncooked meat portions retain their shape and will not stick together.

Although various types of equipment may be used, extrusion or division can be carried out in a rotating, cylindrical chunk head having extrusion openings in which meat product is passed through the head while under pressure originating from a meat pump, or through a cryo-compressed extrusion unit. The controlled heating step is typically done by using a thermal screw having a rotating auger-like member that advances meat product through an enclosed chamber containing heated vegetable oil or water in a desired temperature range. An alternative is to introduce the meat product into a heat and control oven. Once the product portions are placed into the thermal screw or oven, they are quickly sealed and then removed by a conveyor mechanism.

The various time and temperature parameters discussed above can vary according to type, grind, portion size and other characteristics of the meat portions, so long as the step of cold mixing is selected to sufficiently break down the meat protein to cause agglomeration, and the step of controlled heating nugget portions is sufficient to cause denaturization and setting of the surface protein layer without causing internal cooking. It is further realized that the aforementioned specific steps and parameters can be varied somewhat without departing from the scope of the claimed invention, including specifically the sequence of steps. The controlled heating of course must follow the division steps, however, and the quick freezing must follow the controlled heating step.

We claim:

1. A method of preparing a plurality of raw meat product portions comprising:

physically working the raw meat so that break down of the meat protein is effected to cause binding between meat particles;

dividing the raw meat into individualized product portions; and applying controlled heat for a time and at a temperature sufficient to permit the meat protein residing on the surface layer of the raw meat to denature sufficiently to resist binding to another raw meat portion.

2. A method according to claim 1, including the step of maintaining said raw meat mass at a temperature in the range of approximately 26 degrees Fahrenheit to approximately 34 degrees Fahrenheit during the step of working.

3. A method according to claim 1, wherein the divided raw meat portions are heated in a controlled manner to a temperature from about 100 degrees Fahrenheit to approximately 140 degrees Fahrenheit for a time from about 2 minutes to 9 minutes.

4. A method of preparing raw meat product portions comprising:

chilling a mass of raw meat;

physically working the raw meat so that break down of meat protein is effected to cause binding between meat particles;

dividing the raw meat mass into individualized discrete product portions; and applying controlled heat to the product portions for a time and at a temperature sufficient for the raw meat to resist binding to product portions while at the same time creating a sealed outer layer on the product portions without internally cooking the inside of each product portion.

5. A method according to claim 4, further comprising bringing the divided raw meat product portions to a temperature in the range of approximately 26 degrees Fahrenheit to approximately 34 degrees Fahrenheit during the step of chilling the raw meat.

6. A method according to claim 4, further comprising maintaining the raw meat at a temperature in the range of approximately 26 degrees Fahrenheit to approximately 34 degrees Fahrenheit during the step of working the raw meat.

7. A method according to claim 4, wherein said range of temperature is from approximately 100 degrees Fahrenheit to approximately 140 degrees Fahrenheit.

8. A method according to claim 4, wherein said range of time is from approximately 2 minutes to approximately 9 minutes.

9. A method of forming uncooked, meat nugget portions capable of retaining their shape and resisting binding with like portions, said method comprising the steps of:

grinding a plurality of raw meat;

chilling the raw meat mass;

physically working the raw meat mass so that break down of the present meat protein is effected to cause binding between meat particles;

extruding the raw meat mass to form individualized nugget portions of the meat; and applying controlled heat in a predetermined range of temperature and a predetermined range of time so that meat protein residing on the surface layer of each portion of the raw meat is denatured, thus sealing each portion to make it resistant to binding to other portions, while not cooking the major portion of the meat inside each product portion.

10. A method according to claim 9, wherein the raw meat is brought to a temperature in the range of approximately 26 degrees Fahrenheit to approximately 34 degrees Fahrenheit during the step of chilling the raw meat.

11. A method according to claim 9, further comprising maintaining the raw meat at a temperature in the range of approximately 26 degrees Fahrenheit to approximately 34 degrees Fahrenheit during the step of working the raw meat.

12. A method according to claim 9, wherein said predetermined range of temperature is from approximately 100 degrees Fahrenheit to approximately 140 degrees Fahrenheit.

13. A method according to claim 9, wherein said predetermined range of time is from approximately 2 minute to approximately 9 minutes.

14. A method according to claim 9, further comprising the step of:

quick-freezing each said portion.

15. A method according to claim 14, wherein said step of quick-freezing includes subjecting each portion to a temperature of minus 25 degrees Fahrenheit.

* * * * *